April 6, 1948.  P. J. DASHER  2,438,965
SELF-SEALING FUEL TANK
Filed Nov. 4, 1941
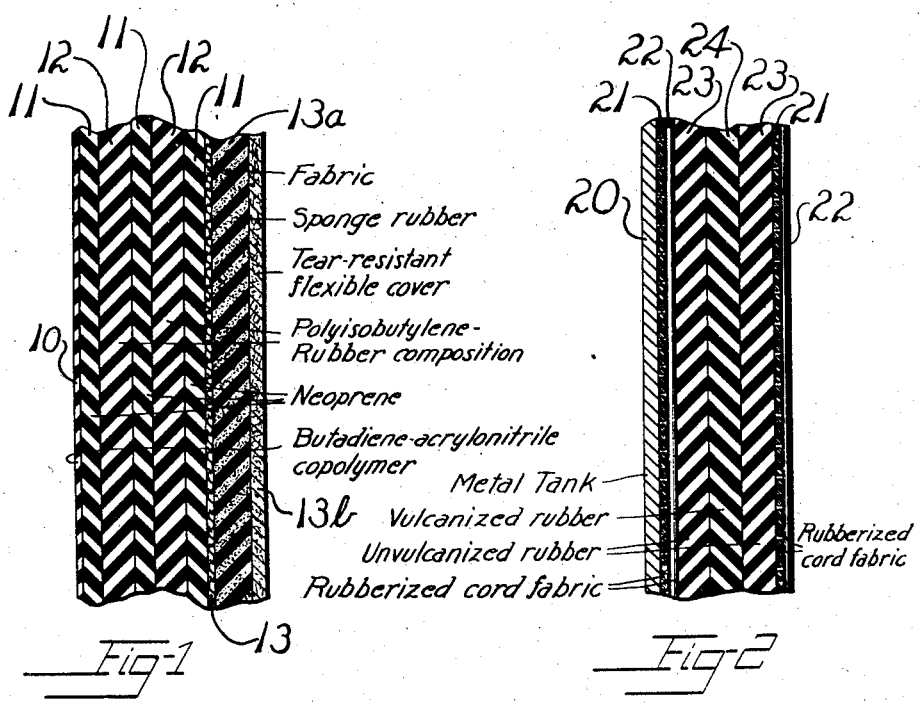
Fig 1 / Fig 2
Inventor
Paul J. Dasher
By Willis J. Avery
Atty Patented Apr. 6, 1948

2,438,965

UNITED STATES PATENT OFFICE 2,438,965

SELF-SEALING FUEL TANK

Paul J. Dasher, Stow, Ohio, assignor to The B. F. Goodrich Company, New York, N. Y., a corporation of New York Application November 4, 1941, Serial No. 417,787

4 Claims. (Cl. 154—43.5)

This invention relates to a new construction for self-sealing fuel tanks and pertains specifically to tanks formed from laminations of rubber-like material.

Tanks of this type are commonly used in airplanes where there is great danger of rupture of the tank by projectiles or shell fragments, with subsequent loss of the contents. In the past these containers have been made by placing between a leather or rubber cover and a gasoline resistant lining a relatively thick sealing layer. This construction has suffered from the disadvantage that the sealing layer, being quite soft and easily ruptured, is readily broken open again, after it has once sealed the rupture, by ordinary mechanical vibration. The surge of the gasoline, oil, or other fuel contained in the tank caused by the maneuvers of the airplane or other vehicle also exerts a considerable pressure upon the newly-formed seal.

I have now discovered a construction which overcomes these difficulties. By using a plurality of relatively thin sealing layers alternating with thin non-sealing laminations which have a high elasticity and a high tensile strength, a combination of self-adherent power with tensile strength sufficient to hold the edges of the sealing member together may be obtained.

The lining of the tank, which is in direct contact with the fuel, may be made of any resilient material which is substantially unaffected by and impervious to the fuel. Among such materials are polyvinyl chloride plasticized with gasoline-insoluble non-volatile liquids, polyvinyl alcohol plasticized with glycerine or the like, other plasticized polyvinyl esters, cellulose esters, and the like, although it is preferred to use a vulcanizable material, such as neoprene, a polyalkylene sulfide, or a copolymer of butadiene with acrylonitrile. The vulcanizable lining may also be coated with a gasoline-insoluble material such as cellulosic derivatives, acryloid resins, vinyl resins, or the like. If desired, a reinforcement such as fabric, cord, or the like may be embedded in the inner layer, or may be applied either alone or in another layer of rubber-like material around the outside of the lining.

The sealing or self-adhering layer between the lining or reinforcement and the cover is made from an adhesive material which swells in hydrocarbon liquids. Suitable materials are unvulcanized rubber, in particular unvulcanized latex sheet, polyisobutylene, and such synthetic rubbers as the unvulcanized copolymers of butadiene or isoprene with methyl acrylate, methyl methacrylate, or styrene. If desired, the swelling material may be mixed with a rubber-like material which is insoluble in hydrocarbon liquids as claimed in the copending application Serial No. 351,195, filed August 3, 1940, now abandoned, by Richard A. Crawford. Suitable insoluble rubber-like materials comprise neoprene (polymerized chloroprene), copolymers of butadiene or isoprene with acrylonitrile or one of its homologs, or even soft vulcanized rubber.

Typical compositions may be made by mixing polyisobutylene with rubber and vulcanizing the rubber, mixing rubber or polyisobutylene with a copolymer of butadiene and acrylonitrile which may either be vulcanized or be left unvulcanized; or mixing rubber or polyisobutylene with neoprene (preferably vulcanized). The two ingredients may be mixed in a wide range of proportions; in general, the quantity of neither should greatly exceed three times the quantity of the other, and it is frequently desirable to have them present in equal proportions. Fillers, softeners, antioxidants, and the like may be present in any proportions which do not substantially affect the essential properties of the ingredients.

It is preferred to apply this material in the form of a plurality of thin layers between thin layers of a tough, resilient material. The most suitable materials for this tough layer are made by vulcanizing soft rubber, or synthetic rubbers such as neoprene and copolymers of butadiene or isoprene with methyl acrylate, methyl methacrylate, styrene, acrylonitrile, and the like. Reinforcing agents such as carbon black may be advantageously employed in this layer as well as other pigments and antioxidants.

The relative thickness of the tear-resistant layers and the intermediate sealing layers may vary widely, but in general the tear-resistant member is preferably between one-fourth and one-half as thick as the sealing member.

For most purposes, the total thickness of the composite sealing member need be no more than one-half inch. My new sealing member may be used in combination with other sealing layers if desired. It is particularly effective when used in conjunction with a layer of closed-cell gas-expanded sponge rubber, such as that known as moss rubber or caoutchouc mousse. Although the subdivision of my new sealing member into separate layers may be carried as far as desired, it has been found that there is usually no further advantage to be gained in employing more than five such subdivisions.

The cover of the tank may be of any flexible, highly tear-resistant material. The same material as that used for interleaving the successive sealing plies may suitably be employed as well as such materials as leather, fabric, rubberized fabric, or the like. If it is in itself not impervious to hydrocarbon solvents, its outer surface, at least, should be treated to make it so in order to avoid damage from accidental spillage.

Although constructions of this kind have a rather high tensile strength, they have very little rigidity, so that it is usually desirable to provide a close-fitting supporting structure for the tank when in use. Among the materials suitable for this purpose are even-grained soft woods such as white pine, balsa, cork, or the like, or a relatively thin metal sheet, such as sheet aluminum, or such resilient materials as hard rubber sponge.

Specific examples of my new construction are shown in the attached drawing, in which Fig. 1 is an enlarged cross-section of a tank wall, and Fig. 2 is a similar view of another modification of my construction. In Fig. 1 the inner gasoline-resistant layer 10 is formed of a vulcanized copolymer of butadiene and acrylonitrile about .025 to .035 inch thick. Adhered to this layer is a layer 11 of vulcanized neoprene about .018 inch thick. Adhered to the neoprene layer is a sheet 12 of sealing composition about .075 inch thick. This composition contains about 57 parts by weight of rubbery polyisobutylene, about 13 parts of viscous liquid polyisobutylene, and 30 parts of vulcanizable rubber. In Fig. 1 two of these layers 12 are used together with three layers 11 as shown. A reinforcing ply 13 of duck fabric frictioned and coated with neoprene, .050 inch thick, is adhered to the outer layer 11, followed by a layer of sponge rubber 13a about .250 inch thick.

A cover 13b about .09 inch thick is finally adhered to the sponge layer 12a. This cover, as pointed out in the foregoing description, may be made of leather or a vulcanized neoprene composition or even of the same composition as that used for layer 11. It is usually desirable to add about 30 to 40 parts by volume of carbon black to the rubber or synthetic rubber composition used for this outer layer in order to give it the maximum possible toughness and tear-resistance, since it is in direct contact with the supporting structure.

My new construction may also be applied externally to a metal tank. In this case no additional gasoline-resistant lining is necessary. An example of this type of construction is given in Fig. 2, in which a metal tank wall 20 is covered with two plies 21, 22 of tire fabric coated with a vulcanized rubber composition, the cords of which are crossed with respect to each other. This fabric is of the weftless type and is preferably made from rayon, although cotton or other fibers may be used. Adhered to the outer fabric ply is a layer of unvulcanized latex sheet 23 about .063 inch thick. This is covered with a layer 24 about .063 inch thick of tough vulcanized rubber such as is used for the treads of tires. Another layer of unvulcanized rubber is placed over layer 24, and the whole is covered with two more plies of rubber-coated crossed tire fabric, 21 and 22, which serve both as reinforcement and as cover for the finished construction.

The construction of my invention is particularly useful for relatively large tanks. The pressure cone build up in the liquid in front of a projectile when it enters a tank tends to bulge the rear wall of the tank outwardly, the magnitude of the bulge being proportional to the thickness of the liquid layer in the tank through which the projectile passes. This condition, together with the fact that the projectile is usually tumbling while it passes through the liquid rather than proceeding point foremost leads to the production of very large rips in the tank at the point of exit of the projectile. In tanks of my construction it is found that the edges of the sealing member are much more readily brought together after rupture, and are much more firmly held in this position than in the case of tanks made with a single, relatively thick sealing member without vulcanized layers to improve its properties. If any small opening is left in the wall of my construction after it has been pierced, the fuel in the tank causes the self-adhering layers to swell sufficiently rapidly to prevent any substantial leakage.

It will be understood that my invention is not limited to the specific examples given, but that various modifications, apparent to one skilled in the art, lie within the spirit and scope of the appended claims.

I claim:

1. In a self-sealing tank comprising a lining impervious to hydrocarbon liquids, a sealing member, and a tear-resistant outer cover, a sealing member comprising a plurality of layers of a self-adherent composition comprising a rubbery material which swells in hydrocarbon liquids and a rubbery material which is insoluble in hydrocarbon liquids, and intervening layers of a tough resilient rubber-like material, which will not swell substantially in hydrocarbon liquids between the self-adherent layers, all adhered together.

2. In a self-sealing fuel tank comprising a gasoline-impervious lining, a sealing member, and a tear-resistant outer cover, a sealing member comprising a plurality of layers of a self-adherent composition comprising a rubbery material which swells in gasoline and a rubbery material which is insoluble in gasoline, and intervening layers of a tough resilient rubber-like material which will not swell substantially in gasoline between the self-adherent layers, all adhered together.

3. In a self-sealing fuel tank comprising a gasoline-impervious lining, a textile reinforcement, a sealing member, and a tear-resistant outer cover, a sealing member comprising a plurality of layers of a self-adherent composition comprising a rubbery material which swells in gasoline and a rubbery material which is insoluble in gasoline, and intervening layers of a tough resilient rubber-like material which will not swell substantially in gasoline between the self-adherent layers, all adhered together.

4. In a self-sealing fuel tank comprising a gasoline-impervious lining, a textile reinforcement, a sealing member, and a tear-resistant outer cover, a sealing member comprising a plurality of layers of a self-adherent composition comprising a rubbery material which swells in gasoline and a rubbery material which is insoluble in gasoline, and intervening layers of a tough resilient rubber-like material which will not swell substantially in gasoline between the self-adherent layers, and a layer of gas-expanded closed-cell sponge rubber, all adhered together.

PAUL J. DASHER.

REFERENCES CITED

The following references are of record in the file of this patent:

UNITED STATES PATENTS

| Number | Name | Date |
|---|---|---|
| 1,297,305 | Thatcher | Mar. 11, 1919 |
| 1,325,448 | Macbeth | Dec. 16, 1919 |
| 1,381,175 | Ericson | June 14, 1921 |
| 1,386,791 | Murdock | Aug. 9, 1921 |
| 1,406,667 | Macbeth | Feb. 14, 1922 |
| 1,779,397 | Kraft | Oct. 21, 1930 |
| 1,931,922 | Damsel et al. | Oct. 24, 1933 |
| 2,102,590 | Gray et al. | Dec. 21, 1937 |
| 2,181,188 | Kemp et al. | Nov. 28, 1939 |
| 2,194,341 | Voorhees | Mar. 19, 1940 |

FOREIGN PATENTS

| Number | Country | Date |
|---|---|---|
| 301,089 | Great Britain | Sept. 26, 1929 |